United States Patent
Bogdanowicz

[15] 3,687,531
[45] Aug. 29, 1972

[54] CARTRIDGE FOR CONTINUOUS LOOP FILM

[72] Inventor: Mitchell J. Bogdanowicz, 435 W. 57th St., New York, N.Y. 10019

[22] Filed: Nov. 24, 1970

[21] Appl. No.: 92,475

Related U.S. Application Data

[62] Division of Ser. No. 686,036, Nov. 28, 1967, Pat. No. 3,545,851.

[52] U.S. Cl. ............352/72, 242/55.19 A, 352/126, 352/34
[51] Int. Cl. ....................G03b 23/02, G03b 31/00
[58] Field of Search............352/72, 74, 78, 126, 34; 242/198, 55.19 A

[56] References Cited

UNITED STATES PATENTS

| | | | |
|---|---|---|---|
| 3,284,155 | 11/1966 | Jensen et al. | 352/72 X |
| 3,479,112 | 11/1969 | Lester | 352/126 X |
| 2,241,231 | 5/1941 | Wittel | 352/72 |
| 2,449,626 | 9/1948 | Suthann | 352/74 |

*Primary Examiner*—Samuel S. Matthews
*Assistant Examiner*—Robert P. Greiner
*Attorney*—R. Welton Whann

[57] ABSTRACT

A cartridge for storing motion picture film having a sound track thereon, the film being disposed in a continuous loop. The film is moved past a sound reproducing device and subsequently past a picture projecting gate. The film moves past the sound reproducer in a plane parallel to a plane tangential to the film loop and past the picture gate at right angles thereto. The film is positively driven by a pair of sprocket wheels disposed ahead of and beyond the picture gate. The film is tensioned ahead of the sound reproducer by two spring-biased idler rollers between which an idler drum may be forced, the latter being mounted on the film projector. A clutch, connected with the projector power source, and springs for orienting the cartridge in the projector housing are also provided. The springs orient the cartridge so that the sprocket wheel and clutch are disengaged when the cartridge is fully inserted in the projector housing. A manually operable device is provided to move the cartridge from its initially oriented position to an operating position with the sprocket wheel engaging the clutch.

4 Claims, 18 Drawing Figures

PATENTED AUG 29 1972 3,687,531

INVENTOR.
MITCHELL J. BOGDANOWICZ
BY
ATTORNEY

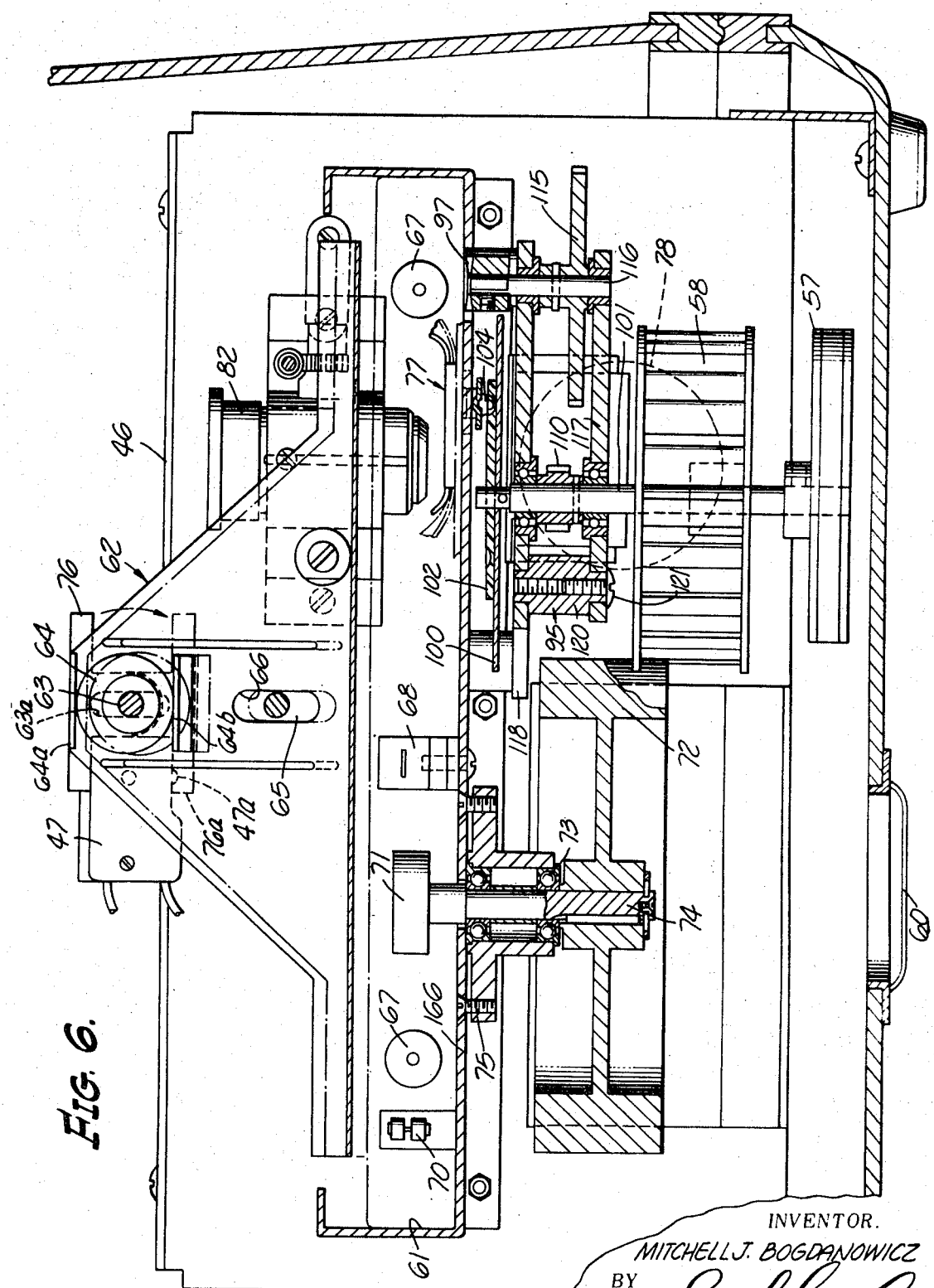

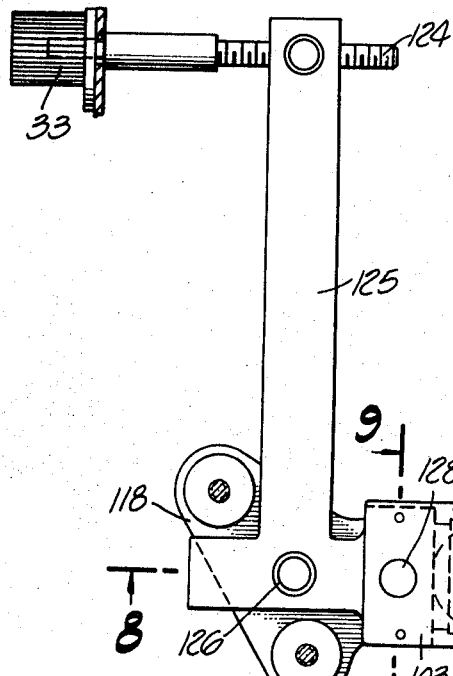
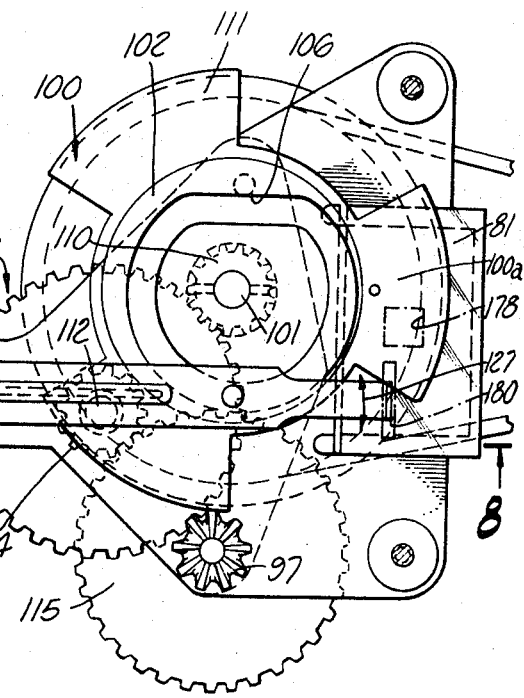
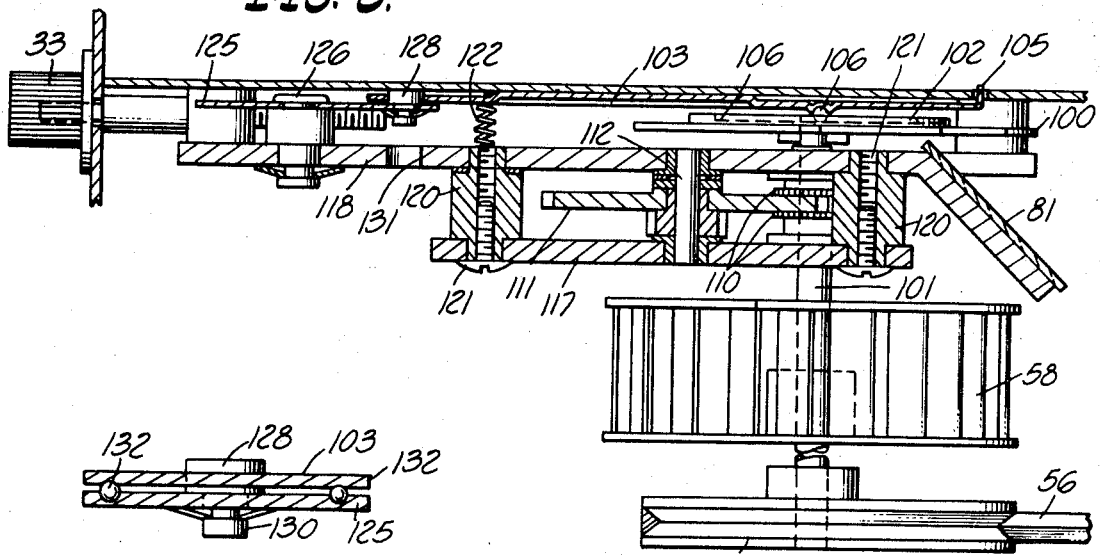

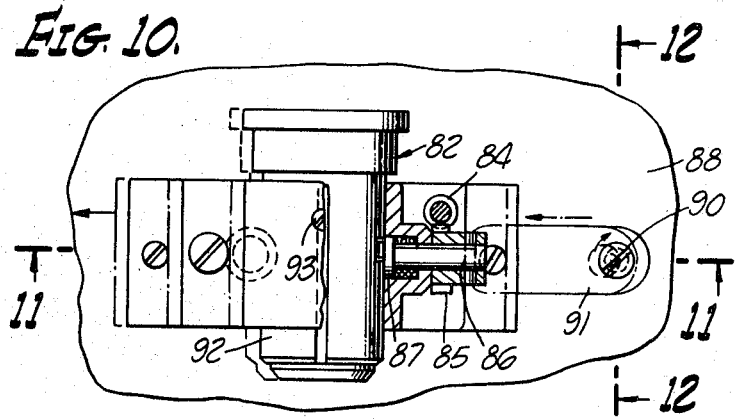
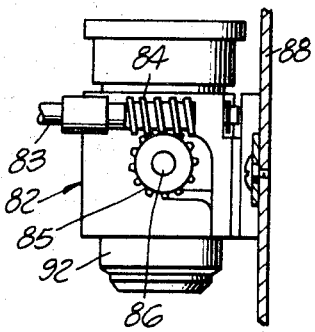
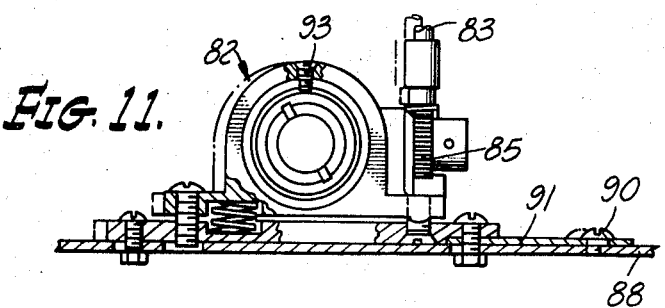
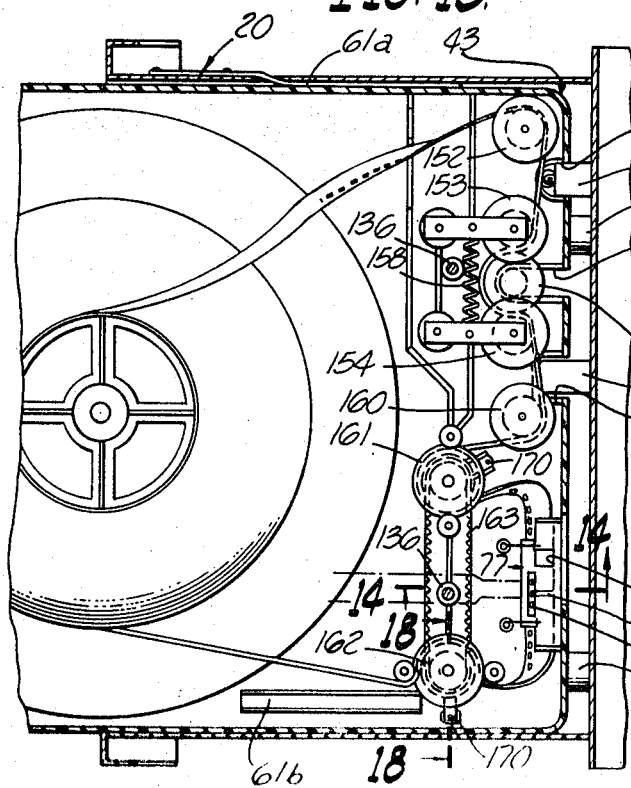
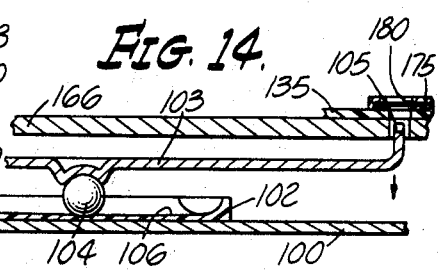
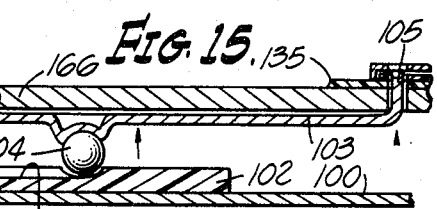
INVENTOR.
MITCHELL J. BOGDANOWICZ
ATTORNEY

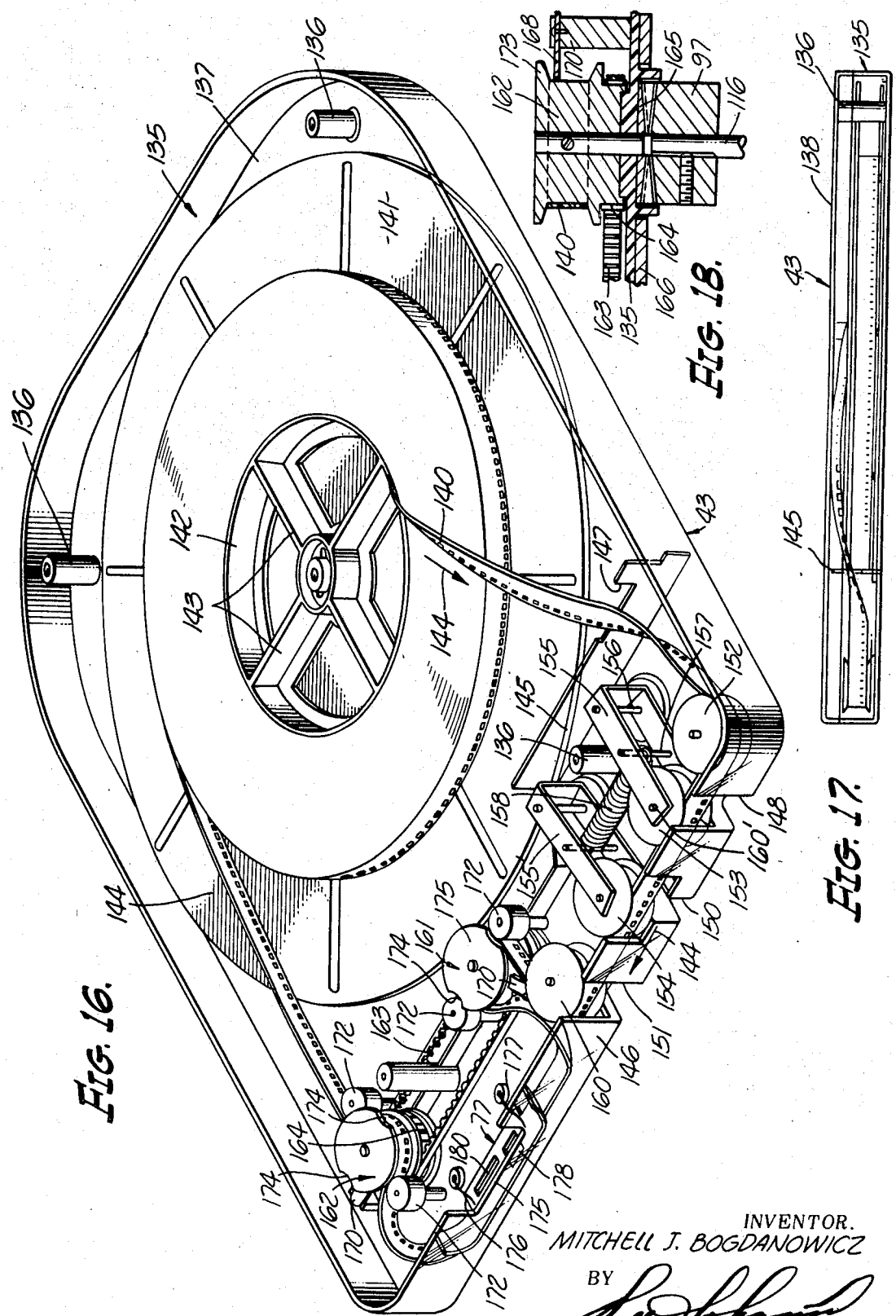

CARTRIDGE FOR CONTINUOUS LOOP FILM

This is a division of application Ser. No. 686,036, filed Nov. 28, 1967 and now U.S. Pat. No. 3,545,851.

BACKGROUND OF THE INVENTION

This invention relates generally to motion picture projecting apparatus, and particularly relates to a film cartridge for use with a film projector, the cartridge holding and storing a motion picture film with sound track arranged in a continuous loop.

The film cartridge of the present invention may be considered to be an improvement of that disclosed and claimed in the U.S. Pat. to Jensen and Goldstone No. 3,284,155, issued on Nov. 8, 1966, entitled Continuous Film Cartridge and assigned to the assignee of the present invention.

Briefly, in order to eliminate the problem of handling and threading motion picture film having a sound track thereon by the average user of a portable, relatively inexpensive motion picture projector, it has been proposed to use a self-contained film cartridge. Such a film cartridge stores and holds a continuous loop of the film. Hence each different motion picture film is in its own film cartridge and the film need not be handled by the user.

Such a film, however, raises the problem of how to drive the film in the cartridge. This film must be moved continuously past a sound reproducer to reproduce the sound track. On the other hand, the film must be moved past the film gate intermittently by a suitable mechanism such as a claw having a pair of claw fingers. In the Jensen, et al. patent above referred to, this has been accomplished by moving the film both past the sound reproducer and past the film gate in such a manner that the plane of the film is substantially at right angles to a plane tangential to the film loop. Thus the film moves in a horizontal plane, assuming that the film loop is stored with a plane tangential thereto in a vertical direction. This arrangement much facilitates projecting light through the film.

However, difficulties have been experienced in causing the film to move smoothly and at a continuous speed past the sound reproducer. Such a variation in speed will cause the pitch of the sound to vary in a disagreeable manner, hence impairing the sound fidelity.

SUMMARY OF THE INVENTION

It is accordingly an object of the present invention to provide a film cartridge of the character referred to which permits the film to move, under all operating conditions, at a constant speed past the sound reproducer, thereby to improve the quality of the sound.

A further object of the invention is to guide the film in the film cartridge in such a manner that it moves only past the film gate with the plane of the film at right angles to a plane tangential to the film loop, while the plane of the film moving past the sound reproducing device has its plane parallel to the tangential plane on the film loop, thereby to facilitate a positive film drive.

Another object of the invention is to provide a mechanism for tensioning the film ahead of the sound reproducer and ahead of the positive sprocket drive of the film to insure a constant film speed past the sound reproducer and to substantially prevent variation of the film speed.

A film cartridge in accordance with the present invention serves the purpose of holding and storing a motion picture film arranged in a continuous loop. The film has the usual sprocket holes therein and has a sound track. Preferably the sound track consists of a magnetic tape on the film. The film cartridge comprises a housing for receiving a loop of the film and has a front portion.

First means are provided for guiding the film along a first predetermined path within the front portion. The plane of the film is parallel to a plane tangential to the film loop. This path may be called the sound reproducing path. Accordingly, an opening in the front portion permits access of a sound reproducing device to the sound track of the film which moves past the opening.

Second means are provided for twisting the film so that the film plane is now disposed substantially at 90° with respect to the tangential plane. The second means further guides the film along a second predetermined or film projecting path. This second means includes apparatus for positively driving the film at a continuous speed at the beginning and at the end of the second film projecting path.

The front portion of the cartridge has a transparent area which extends along the second film projecting path for permitting light to be projected through the front portion and the film therein. A second opening is provided in the front portion and also along the second film projecting path for permitting access of an intermittent film advancing mechanism to the sprocket holes in the film to move the film intermittently past the film gate.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 6 is a vertical sectional view on enlarged scale, taken on line 6—6 of FIG. 5;

FIG. 7 is a horizontal detail view on enlarged scale taken on line 7—7 of FIG. 5 and illustrating particularly the shutter and gear drive, the claw which intermittently advances the film and the adjustment of the claw which adjusts the position of the film frames;

FIG. 8 is a sectional view taken on line 8—8 of FIG. 7;

FIG. 9 is a view on enlarged scale taken on line 9—9 of FIG. 7 and illustrating the relative adjustment between the film advancing claw and its cam;

FIG. 10 is a detail view of the projection lens and its adjusting mechanisms;

FIG. 11 is a sectional view taken on line 11—11 of FIG. 10;

FIG. 12 is an elevational and sectional view taken on line 12—12 of FIG. 10;

FIG. 13 is a top plan view of the film cartridge in position in the film projector with the cartridge cover removed;

FIG. 14 is a side elevational view, taken on line 14—14 of FIG. 13 and illustrating the intermittent film advancing claw and its cam follower and the cam, the claw being shown in the retracted position;

FIG. 15 is a side elevational view identical to that of FIG. 14, except that the claw is shown in its sprocket hole engaging position;

FIG. 16 is a view in perspective of the film cartridge with the cover removed, the cartridge being shown disengaged from the film projector;

FIG. 17 is a side elevational view on reduced scale of the cartridge of FIG. 16, together with its cover; and FIG. 18 is a sectional view on enlarged scale taken on line 18—18 of FIG. 13 and illustrating the clutch for driving the drive sprocket in the cartridge.

DESCRIPTION OF THE PREFERRED EMBODIMENTS

Figure 1:
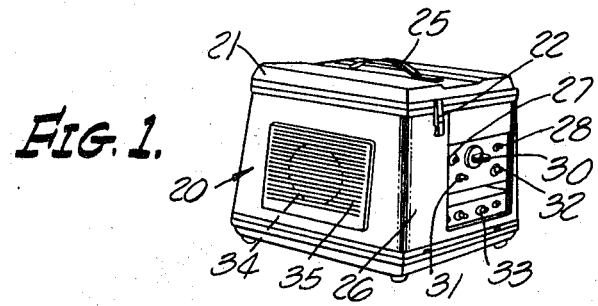
FIG. 1 is a view in perspective of a film projector.

Referring now to the drawings and particularly to FIGS. 1 through 12, 14, 15 and 18, there is illustrated a film projector. This projector is claimed in the copending patent application entitled Projector for Continuous Loop Motion Picture Film filed in the name of the inventor of the present application and assigned to the assignee of the present application. This film projector is particularly adapted to use a new 8 mm. motion picture film which is sold in the trade by Eastman Kodak Corp. under the name of Super 8. This film has smaller size sprocket holes than the conventional 8 mm. motion film. Instead of moving at 18 feet per minute as does the old film, it moves at 20 feet per minute with correspondingly larger frames. As is conventional 24 frames are projected per second, each frame being projected three times to provide an apparent projection rate of 72 pictures per second to eliminate flicker.

Figure 2:
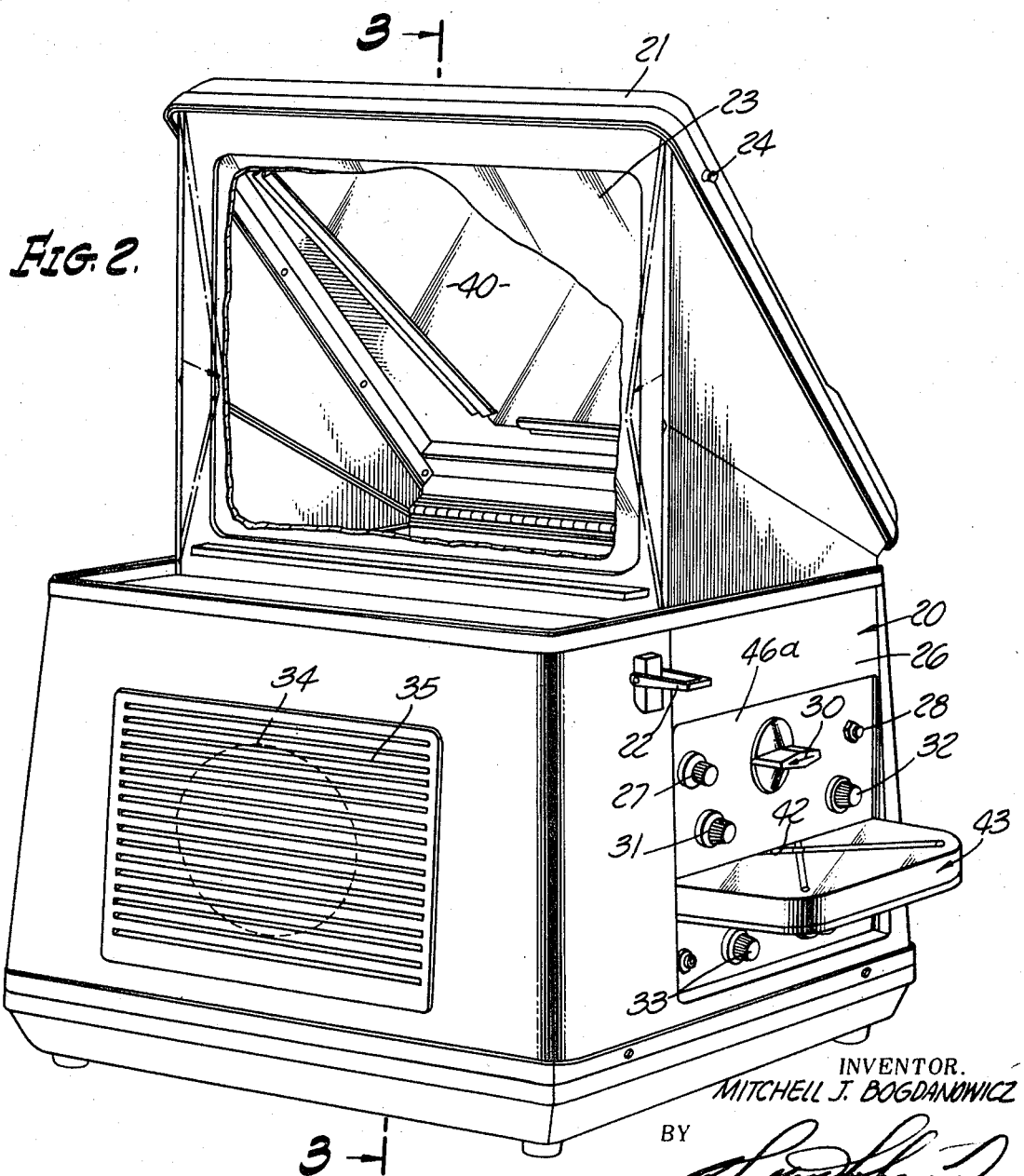
FIG. 2 is a view in perspective, on enlarged scale, of the film projector of FIG. 1 with its top raised showing the screen in its operative position and further showing a film cartridge partly inserted into the projector.

As shown particularly in FIGS. 1 and 2 the projector is provided with a housing 20 having a top 21 which may be raised as shown in FIG. 2 to rotate a screen 23 into its operating position. The top 21 may be secured to the housing 10 in the inoperative position by a catch 22 engaging a pin 24 in the top 21. A handle 25 forming a loop is disposed at the top 21 to facilitate carrying of the projector.

The side wall 26 of the housing 20 carries the operating controls. These include a volume control knob 27 for controlling the sound volume, a start button 28, a lever 30 for releasing or locking the film cartridge, a tone control knob 31, a picture focus adjustment knob 32 and a picture framing control knob 33. There may also be a female outlet for receiving a plug carrying house current and a fuse. The operation of these controls will be subsequently explained, except for the volume and tone controls which, together with the sound amplifier reproduction system, form no part of the present invention. The sound is reproduced by a loudspeaker 34 covered by a grille 35.

Figure 3:
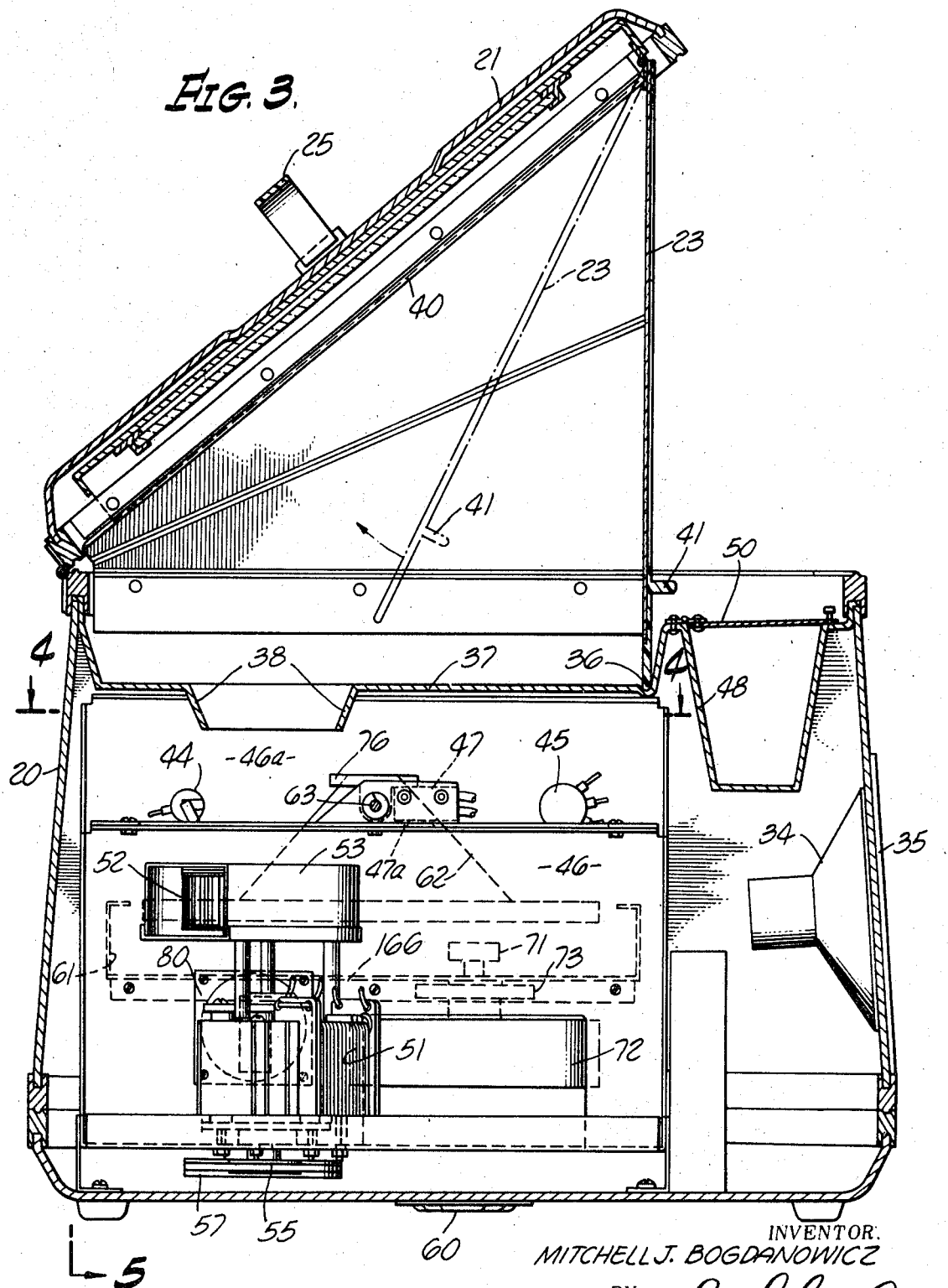
FIG. 3 is a vertical sectional view taken on line 3—3 of FIG. 2.

As clearly shown in FIGS 3, the screen 23 is adapted to be retracted into the top 21 when the top is folded down. In the operating position the screen 23 engages a longitudinal recess 36 in a light shield 37 secured to the housing 20 and forming an open cone 38. The cone 38 defines a light path for the light from a film frame onto a mirror 40 disposed in the top 21. The screen 23 may have a projecting part or handle 41 which permits to position the screen when the top is raised. On the side wall 26 of the housing 20 there is provided an opening 42 for permitting a film cartridge 43 to be inserted.

A start switch 44 operated by the start button 28 and a volume potentiometer 45 controlled by the volume control knob 27 are disposed on an intermediate partition 46a. The partition 46 supports a microswitch 47 operated by the cartridge lock-down assembly, as will be explained subsequently. A compartment 48 having a lid 50 may be formed in the housing 20 and may be secured to the light shield 37. It may be used to hold auxiliary equipment such as an electric cord or the like.

An electric motor 51 furnishes the electric power for all driven elements. It drives the film continuously past the sound reproducing device and intermittently past the film date, and also operates the film shutter. The motor 51 also drives a blower 52 in a housing 53 which exhausts the hot air through a set of louvers or vents 54 (see FIGS. 4 and 5) in the housing 20. The motor 51 drives a motor pulley 55 through a drive shaft. As shown particularly in FIGS. 4 and 5, a drive belt 56 drives a shutter pulley 57 which in turn drives the shutter and a gear train. The shutter pulley 57 also drives another blower 58 which draws cool air through vent 60 in housing 20, and circulates this air to cool the moving parts.

Figure 4:
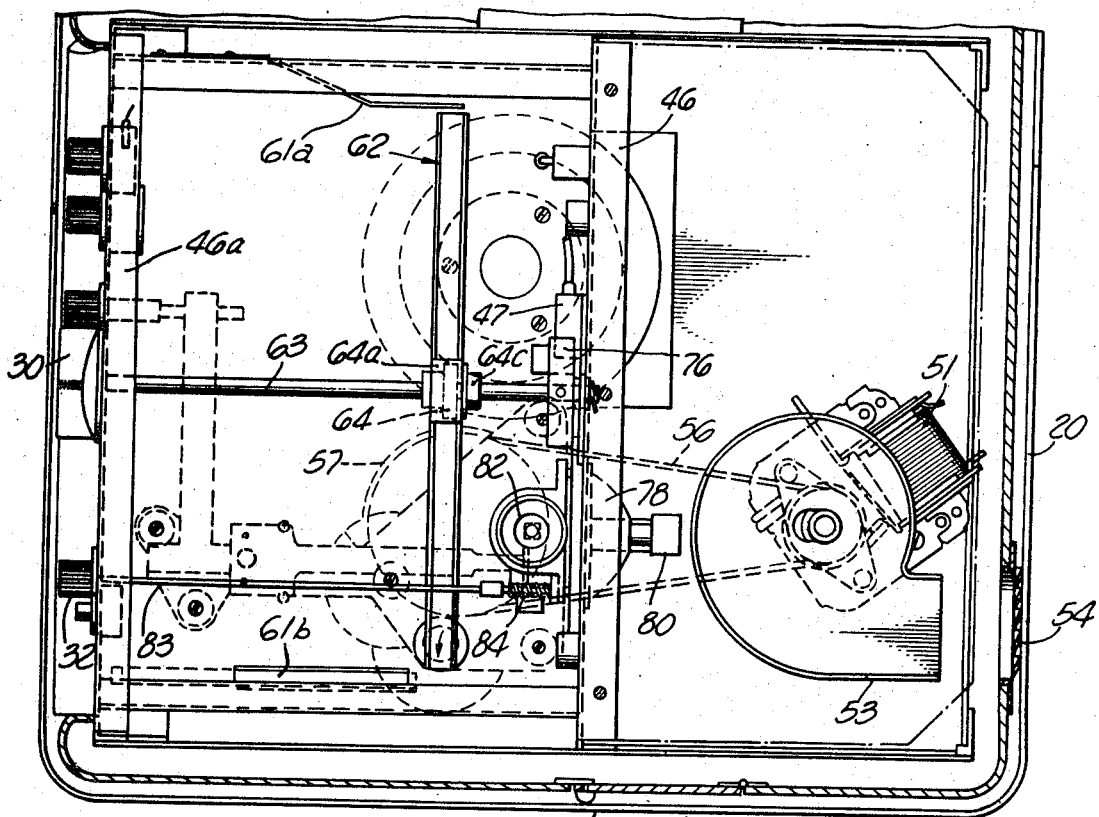
FIG. 4 is a horizontal sectional view taken on line 4—4 of FIG. 3.
Figure 5:
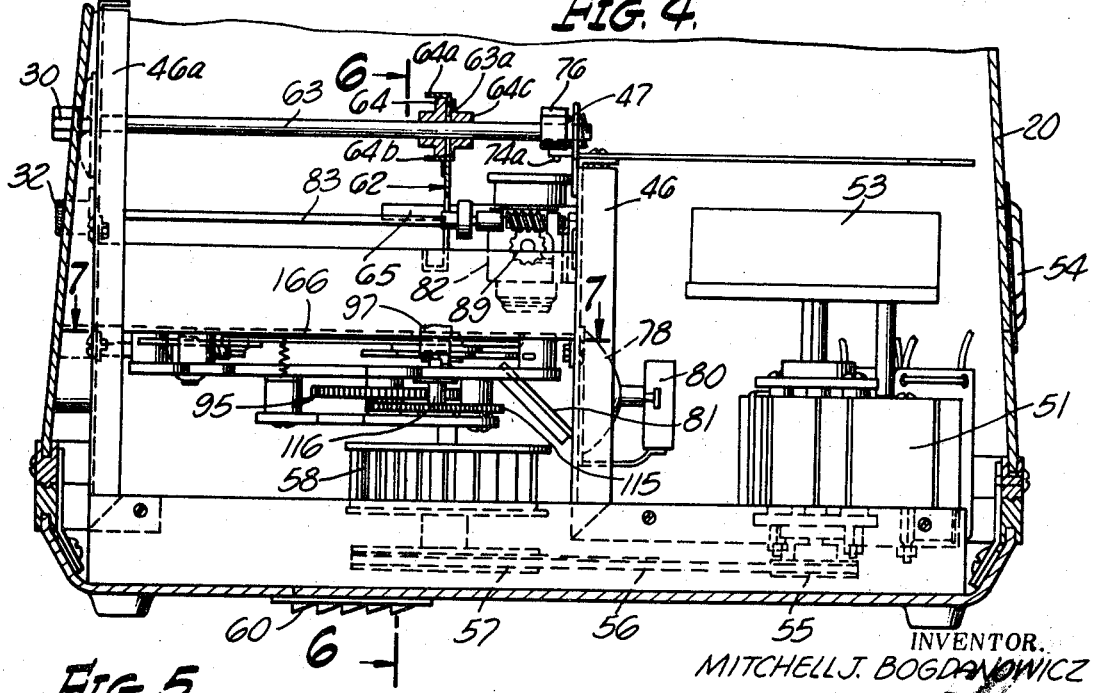
FIG. 5 is a vertical sectional view taken on line 5 of FIG. 3, parts being broken away.

The film cartridge 43 is inserted into a generally U-shaped opening 61 shown particularly in FIG. 6. During insertion of the cartridge, it is oriented by concerted action of leaf springs 61a and 61b, as shown in FIG. 4. It will be apparent that the spring 61a, being at the left side of the cartridge will act to urge the cartridge towards the right side of the opening 42 while the spring 61b, being at the bottom of the right side of the cartridge will act to urge this side in an upward direction. Thus, the inserted cartridge will initially have a slightly canted position. The cartridge 43 may then be locked by a lock-down assembly shown generally at 62. This includes a triangle-shaped lock-down bracket which may be raised or lowered to disengage or press down the cartridge against the action of spring 61b and lock the film cartridge in its operating position. To this end the cartridge locking knob 30 rotates a shaft 63 which extends through vertical slot 63a in the vertical wall 62 and on which is fixed an eccentric cam 64. A flanged hub 64c cooperates with cam 64 to hold the parts in proper relationship. Rotation of the cam 64 in turn raises and lowers the lock-down bracket 63 by engagement with flanges 64a and 64b. The lock-down bracket is further guided by a rod 65 in a vertical slot 66. The cartridge is pushed back into the projector against a pair of stops 67. A sound reproducing device such as a magnetic pick-up head 68 is positioned to engage the sound track on the film in the film cartridge. An auxiliary pick-up head 70 is also positioned in the path of the film and serves the purpose of shutting off the electric motor at the end of the motion picture film in response to a special signal secured to the film. An idler drum 71 serves a purpose to be more fully explained hereinafter. It provides friction on the film before it passes the magnetic head 68 and is connected to an appreciable inertia device such as a flywheel 72. The shaft 74 of the flywheel 72 is mounted in ball bearings 73 secured to a chassis wall 166 by a bearing house 75. A switch bar 76 forms part of the lock-down assembly and operates the microswitch 47.

The path of the light through the film gate generally shown at 77 will now be explained. The lamp 78 (see FIGS. 4 and 5) is disposed in a socket 80 and projects light through a fixed mirror 81 and a film frame into a lens assembly 82. From the lens assembly 82 the light is projected onto the mirror 40 (see FIG. 3) and eventually onto the viewing screen 23. The lens assembly 82 is adjustable to provide focusing of the image. To this end the focus knob 32 has a shaft 83 for rotating a worm 84 which meshes a gear 85 as shown particularly in FIGS. 10 to 12. The gear shaft 86 carries an eccentric adjustment cam 87 for raising or lowering the entire lens assembly 82. The lens assembly is fixed to the chassis wall 88 and may be adjusted to the left or right of FIG. 10 by rotating the eccentric screw 90 to move the adjusting strip 91. This will position the lens with respect to the film frames. The lens 92 may be held in position in its mount by means of the guide pin 93.

The film advance mechanism will now be described particularly with reference to FIGS. 5 through 9. The electric motor 51 through the drive belt 56 and the shutter pulley 57 also drives a gear and claw assembly generally shown at 95. The gear assembly includes a gear train 96 for driving a clutch 97 having a frusto-conical surface for engaging with and driving a sprocket wheel in the film cartridge as will be later explained.

Thus a shutter 100 is driven directly by the shaft 101 driven by the pulley 57. The shutter 100 has three ears 100a for periodically interrupting the light path between the light source 78 and the film frames thereby to project each frame three times. A cam 102 is also driven by the drive shaft 101. This cam 102 controls the movement of a claw 103 through a cam follower 104. The cam follower 104 is ball shaped and may be secured to the claw 103, for example by welding, to facilitate the assembly. The claw has two claw fingers 105 for intermittently engaging the sprocket holes in the film and for advancing the film intermittently past the film gate 77. To this end the cam 102 has a groove 106 for raising and lowering the fingers 105 into and out of the sprocket holes and at the same time for moving the claw laterally to advance the film.

Accordingly the cam groove 106 periodically raises and lowers the claw 103 by having a deeper or shallower groove as clearly shown in FIGS. 14 and 15. On the other hand, the cam groove 106 is substantially annular with a substantially flat portion as clearly shown in FIG. 7. This causes the cam claw to move left and right of FIG. 7 to advance the film periodically. As a result the claw moves in a substantially rectangular fashion without lost motion to engage the sprocket holes, advance the film and disengage the sprocket holes.

The sprocket drive or clutch 97 is driven by a separate gear train. Thus the pinion 110 is secured to the drive shaft 101 and meshes with a large gear 111 on a shaft 112. Another pinion 114 is secured to the shaft 112 and drives a large gear 115 which in turn rotates the clutch 97 by means of a common shaft 116. The entire gear train 110 to 116 is held by a lower gear plate 117 and an upper gear plate 118 which permit to insert or remove the entire gear train as a unit. The entire assembly is held together by a plurality of posts 120 and screws 121. A pair of springs 122 are each secured to the anchor or plate 122a and pull the claw 103 against the cam follower 104 and cam 102 to assure engagement between claw and cam.

The adjustment of the claw with respect to the film for the purpose of adjusting the position of each film frame will now be explained with reference to FIGS. 7 and 9. The framing knob 33 may be rotated to rotate a screw 124 in a framing bar 125. This will rotate the bar 125 with respect to a pivot 126 to move the position of the outer end of the claw 103 as shown by the arrow 127. This in turn will adjust the film advancing movement of the claw.

In addition the position of the claw may be adjusted in a lateral direction as viewed in FIG. 7. This is accomplished by the eccentric pin 128 having a screw head 130. The slotted head 130 may be rotated by a screwdriver through the opening 131 in the gear plate 118. Rotating of the eccentric pin 128 will move the claw 103 with respect to the framing bar 125. Ball bearings 132 are provided between the framing bar 125 and the claw 103 to facilitate the up and down movement of the claw.

Before describing the operation of the film projector, it is necessary to describe first the film cartridge 43. To this end reference is now made to FIGS. 13 and 16 through 18. FIG. 13 illustrates a portion of the film cartridge 43 inserted into the projector housing 20 and in engagement with the film drive mechanism and the sound reproducing mechanism. FIG. 16 shows the cartridge only with the cover removed while FIG. 17 is a side elevational view of the film cartridge and its cover.

The film cartridge consists of a box-like housing 135 with rounded corners, and an upright wall. A plurality of posts 136 are secured to the bottom wall 137 and provided with threaded holes to receive screws, not shown, which secure the cover 138 to the housing 135. The film 140 is disposed in an endless loop on a rotatable plate 141 secured to an upright cylinder 142 on which the film rests and having four arms 143. The film moves as shown by arrows 144. Thus the film 140 is taken off the inner loop and returned to the outside of the film loop.

The film first passes a partition wall 145 extending parallel to the front wall 146 of the cartridge housing 135. The partition wall has a horizontal cut-out 147 to permit the film to pass into the front portion of the cartridge. The cartridge has from right to left along the path of the film, a first opening 148 for the automatic stop pick-up head 70, a second opening 150 for the idler drum 71, and a third opening 151 for the sound pick-up head 68. In other words, these openings make it possible for the pick-up heads 68 and 70 to pass through the cartridge to contact the sound track on the film while the idler drum 71 can pass through the cartridge into frictional contact with two idler wheels to be presently described.

The film 140 after passing over the cut-out 147 moves over a first idler wheel 152 rotatably mounted in the housing 135. The film then passes over two additional idler wheels 153 and 154. The idler wheel 153 is mounted in a U-shape bracket 155 pivoted in the housing 135 by a post 156. An intermediate post 157 has attached thereto a spring 158 tending to pull against an identical bracket 155' on which the drum 154 is pivotally mounted. The drum 153 is rotatable on a post 160 in the bracket 155. Accordingly each of the two drums 153, 154 is free to rotate and they are urged toward each other by the spring 158.

As shown in FIG. 13, the two drums 153, 154 are forced apart by the idler drum 71 mounted in the projector. This will increase the friction between the film 140 and the two drums 153 and 154. At the same time since the idler drum 71 is connected to the flywheel 72 they form a mass system with a relatively large inertia. This will prevent rapid variations in the speed of the film moving between the drums 153, 71 and 154 thus preventing variations of the pitch of the sound picked up by the magnetic head 68.

Another idler drum 160 is rotatably disposed in the housing 135 past the sound pick-up opening 151. So far, as clearly shown in the drawings, the film 140 moves along the front portion of the film cartridge in a vertical direction, that is, parallel to a plane tangential to the film loop. However, in order to project the light through the film frames more efficiently and without the necessity of retractable mirrors and the like, the film now moves past the film gate 77 at right angles to the tangential plane. In other words, as viewed in FIG. 16 the film moves in a horizontal plane.

In order to achieve this there are provided two sprocket wheels 161 and 162 in the film cartridge. The sprocket wheels 161 and 162 are rotatably journalled in the housing 135 and serve the purpose to positively drive the film 140 in a vertical plane. The two sprockets are connected by a drive belt 163 engaging a lower gear-like portion 164 of the sprockets. The sprocket wheel 162 is provided with a lower frusto-conical portion 165 engageable with the corresponding portion of the clutch 97 as shown in FIG. 18 which also shows a chassis wall 166. The portion 165 and clutch 97 are initially disengaged during insertion of the cartridge, but are brought into engagement by operation of the lockdown mechanism to lock the cartridge in its operating position as previously described. Accordingly the sprocket 162 is driven by the electric motor 51 and the gear train 96, by the clutch 97 and in turn drives the driven sprocket wheel 161.

Each of the two sprocket wheels 161, 162 is provided with a stripper plate 168 and a stripper post 170 (see particularly FIG. 18) secured to the housing 135. The purpose of the stripper post 170 and plate 168 is to prevent the film from wrapping around the sprocket in case the film should break within the cartridge while the motor is running. It also helps to prevent the film loop from wrapping around sprocket 161 before it enters the film gate 77 and from wrapping around the sprocket 162 before returning to film flange 141.

Each of the sprockets 161 and 162 is provided with a pair of idler rollers 172 which guide the film around the sprockets. The top plate 173 of each sprocket is provided with two semi-circular cut-outs 174 which permit to thread the film around the sprockets 161 and 162 when the film is mounted in the cartridge.

The film gate 77 includes two aperture plates 175, only one of which is shown. They are held down by a pair of spring wires 176 and mounted on a rotatable disk 177 on the housing so that the springs may be rotated to permit lifting of the aperture plates. The two plates 175 have a matching pair of apertures 178 and 180. Apertures 178 are substantially square and permit the light from the lamp 78 to be projected through the apertures 178 and the film frame onto the screen 23. To this end the cartridge housing 135 and cover 138 should either be transparent to light or be provided with suitable openings. The other elongated opening 180 is disposed adjacent the film frames over the sprocket holes in the film to permit the claw fingers 105 to pass through the aperture plates into the sprocket holes to move the film intermittently. From the sprocket wheel 162 the film returns to the film loop in the cartridge.

Having described the film projector and the film cartridge, their operation will now be explained. At first the top 21 of the projector is raised after having opened the catch 22, then the screen 23 is positioned in the recess 36. Then the cartridge 43 is inserted into the opening 42 of the projector and pushed against the cartridge stops 67. Now the cartridge lock knob 30 is rotated, thereby to rotate the eccentric 64 and to push down the cartridge locking mechanism 62 whereupon the cartridge is in the operating position. As a result the two pick-up heads 68 and 70 are in contact with the sound track on the film 140. The idler drum 71 has forced the idler rollers 153 and 154 apart against the force of the spring 158. Finally the clutch 97 is in engagement with the driver sprocket wheel 162.

The cartridge locking mechanism 62 has operated the switch bar 76 to close the microswitch 47 by engagement with the actuator 47a, the bar having been moved in the dotted line position 76a as shown in FIG. 6. Hence when the start button 28 is depressed, the machine will start to operate. Now light will be projected from the lamp 78, mirror 81 through a film frame, the lens 92 onto the mirror 40 and the screen 23. The focus may be adjusted by the focus knob 32 as previously explained. This will simply move the lens assembly 82 up or down through the worm gears 84, 85.

At the same time the film is pulled at a continuous speed by the driven sprocket wheel 161 past the two pick-up heads 68 and 70. The idler drum 71 maintains the film 140 in frictional engagement with the idlers 153, 71, 154 to prevent slippage of the film. The flywheel 72 prevents sudden changes of the film speed which would deleteriously influence the quality of the sound reproduction.

The drive sprocket 162 pulls the film in a horizontal direction past the picture gate 77. As shown there is only a small film loop on both sides of the aperture plate 175, that is, after the film passes the sprocket 161 and before the film passes the sprocket 162. However, since the film is positively driven before entering and after leaving the film gate, there is no need for a large film loop to accommodate the intermittent film movement and the continuous film drive.

The framing of the picture may be adjusted with the framing knob 33. This will rotate the framing bar 125 and hence rotate the claw 103 with respect to the longitudinal opening 180 thereby to move the projected picture image up or down into the proper position.

It should be noted that the pulley 57 is driven at the proper speed so that the shutter 100 and the claw cam 102 rotate together once as long as each film frame is held stationary. This will also cause the claw 103 to move the film again at the end of this period. On the other hand the clutch 97 is driven at a different speed to cause the film to move continuously at the rate of 20 feet per minute.

There has thus been disclosed a film cartridge for holding and storing a motion picture film arranged in a continuous loop. The film is positively driven before entering and after leaving the film gate. The film moves in a plane parallel to a plane tangential to the film loop past the sound reproducing mechanism but at right angles thereto past the film gate. This facilitates projecting light through the film frames. On the other hand, means are provided for causing the film to move at a constant speed past the magnetic sound head. This includes two idler springs biased towards each other. Hence an idler drum on the projector can be forced between the two idlers to provide friction on the film so that it can be pulled at a constant speed. Only one of the two sprocket wheels is positively driven by a clutch. The other sprocket wheel is driven by a belt from the drive sprocket wheel.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims.

I claim:

1. The combination with a sound motion picture projector of a film carrying cartridge receivable within the projector, comprising:
   a. a projector housing having a power source including a rotatable clutch, and a cartridge receiving aperture;
   b. a generally flat cartridge housing insertable edgewise into the projector through said aperture, said housing containing film driving means including a sprocket wheel with a driving connection portion extending to the exterior of the cartridge housing, and adapted in a fully inserted operating position of said cartridge to make driving engagement with said clutch;
   c. spring means in the projector housing for orienting the cartridge in an initially fully inserted position in which it is slightly edgewise tilted so that the driving connection portion of the sprocket wheel and said clutch of the projector power source are disengaged; and
   d. projector means manually operable to move the cartridge from its initially oriented position to said operating position, while simultaneously engaging the driving connection portion of the sprocket wheel with said clutch.

2. The combination according to claim 1, wherein the spring means comprises one spring acting on one of the narrow sides of the cartridge for urging it in a lateral direction, and another spring for urging the cartridge at its underside adjacent an opposite narrow side in an upwardly lifting direction on said side.

3. The combination according to claim 1, wherein the driving connection portion of the sprocket wheel is at the underside of the cartridge.

4. The combination according to claim 1, wherein the clutch has a frusto-conical end face adapted in said operating position of said cartridge to make coaxial drive transmitting engagement with a complementary surface on the driving connection portion of said sprocket wheel.

* * * * *